April 28, 1970     K. T. LANG ET AL     3,509,347

OPTICAL SUPERHETERODYNE SYSTEM EMPLOYING NON-SYMMETRICAL WAVES

Filed Aug. 7, 1967     2 Sheets-Sheet 1

INVENTORS
KENNETH T. LANG
ROBERT F. LUCY
EDWARD L. McGANN
BY
ATTORNEY

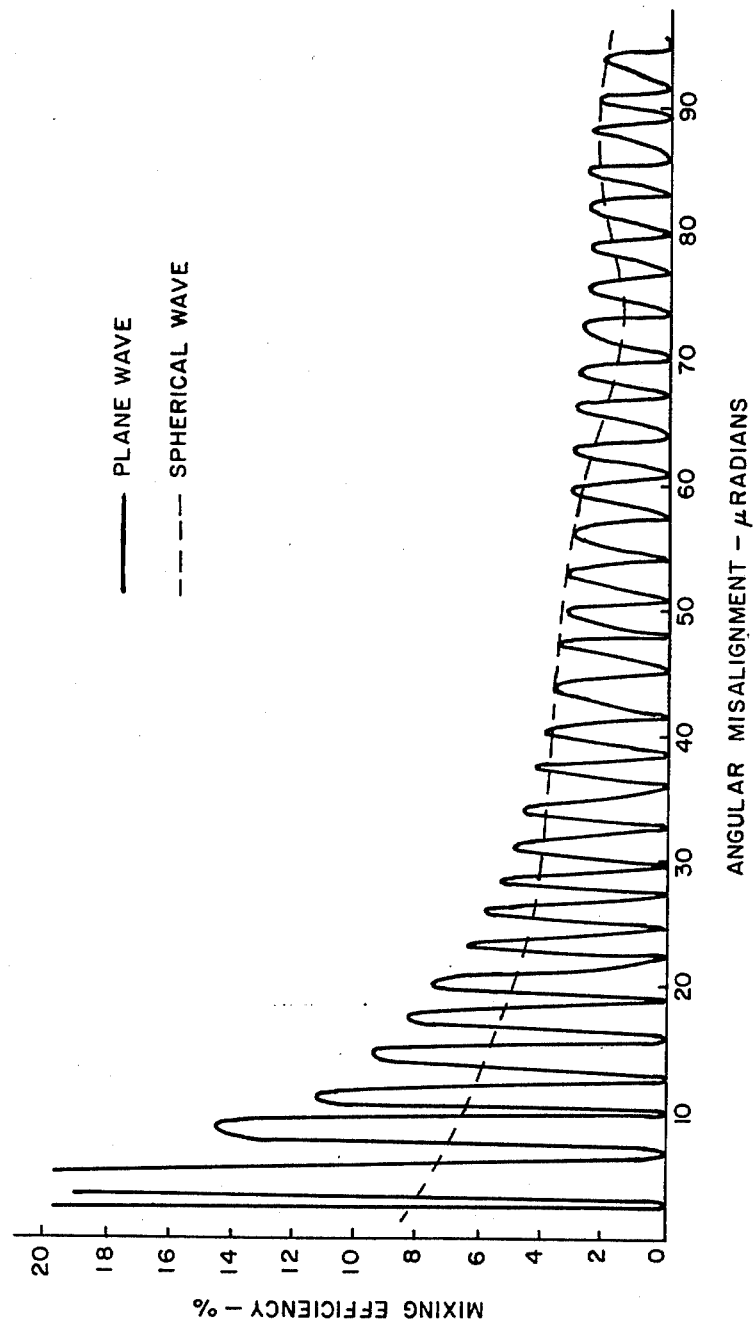

United States Patent Office 3,509,347
Patented Apr. 28, 1970

3,509,347
OPTICAL SUPERHETERODYNE SYSTEM EMPLOYING NON-SYMMETRICAL WAVES
Kenneth T. Lang, Needham, and Robert F. Lucy and Edward L. McGann, Andover, Mass., assignors to Sylvania Electric Products Inc., a corporation of Delaware
Filed Aug. 7, 1967, Ser. No. 658,775
Int. Cl. H04b 9/00
U.S. Cl. 250—199     5 Claims

ABSTRACT OF THE DISCLOSURE

An optical superheterodyne receiver in which the wavefront of the received light beam and the wavefront of the local oscillator light beam are non-symmetrical. The received signal can have either a plane or a spherical wavefront, while the local oscillator signal has a spherical wave front, and the non-symmetry of these signals when mixed permits a heterodyne output even under conditions of angular misalignment.

BACKGROUND OF THE INVENTION

This invention relates to optical communications systems and in particular to an optical superheterodyne receiver operable with relatively uncritical alignment tolerance.

In an optical superheterodyne receiver, an incoming coherent light signal of one frequency is mixed with a coherent local oscillator light signal of a different frequency to produce a difference frequency optical signal which si then transduced by a photodetector to an electrical heterodyne signal.

Conventionally, the received light beam and local oscillator light beam have plane wavefronts and while maximum detector efficiency is obtained by use of plane waves, the angular alignment between the received light beam and the local oscillator light beam must be maintained within extremely critical limits to achieve proper operation. Misalignment between the two beams at the mixing surface will cause interference patterns of a configuration depending upon the degree of angular misalignment between the two beams. These interference patterns, composed of alternate light and dark fringes, when imaged onto the photodetector cause degradation of detector output since the detector output signal is related to the instantaneous spatial average of the light received by the detector. If the angle between the two waves is zero, that is if the two waves are in perfect alignment, then the two waves add in phase, no dark fringes appear, and a maximum photodetector output is obtained. As the angle increases between the two plane waves, the number of light and dark areas increases and when a photodetector is iluminated with this pattern, its output signal is an instantaneous spatial average of the light intensity of the impinging pattern. For example, if the angle between the incoming and local oscillator signals is such that six light areas and five dark areas appear at the photosensitive surface of the detector at any instant of time, the five fringes of one polarity cancels the five fringes of the other polarity and only one-eleventh of the total signal, caused by the sixth light area, appears at the output of the detector. When the angle between the received signal and the local oscillator is such that there are an equal number of light fringes and dark fringes, then the output of the detector is zero. The result is that even if a strong incoming signal forms an angle with the local oscillator signal and creates an equal number of bright and dark areas, no information can be attained from the composite signal since the photodetector output is zero.

Angular alignment between the local oscillator beam and the received light beam is, therefore, extremely critical in conventional optical superheterodyne receiving systems employing plane waves, and in practice such alignment is equally critical to achieve. In addition to difficulties in aligning a separated transmitter and receiver in an optical communication system, misalignment is also caused by atmospheric disturbances which can bend a light beam. It would be advantageous to have and is an object of this invention to provide an optical heterodyning system which is not susceptible to complete cancellation of an incoming signal due to angular misalignment between a received signal and a local oscillator signal.

SUMMARY OF THE INVENTION

In accordance with the present invention, a coherent light beam from a suitable source and having a predetermined wavefront is mixed with a local oscillator light beam having a wavefront non-symmetrical to the wavefront of the source beam to provide a heterodyne output signal which does not substantially fade under conditions of misalignment between the local oscillator beam and the received beam. Typically, the light beam from the source has either a plane or a spherical wavefront while the wavefront of the local oscillator light beam is spherical but with a radius of curvature different from that of the source beam to assure non-symmetry of the beams to be mixed.

DESCRIPTION OF THE DRAWINGS

The invention will be more fully understood from the following detailed description, taken in conjunction with the accompanying drawings in which:

FIG. 2 is a plot of photodetector mixing efficiency versus angular misalignment, useful in illustrating the operation of the invention.

DETAILED DESCRIPTION OF THE INVENTION

Figure 1:
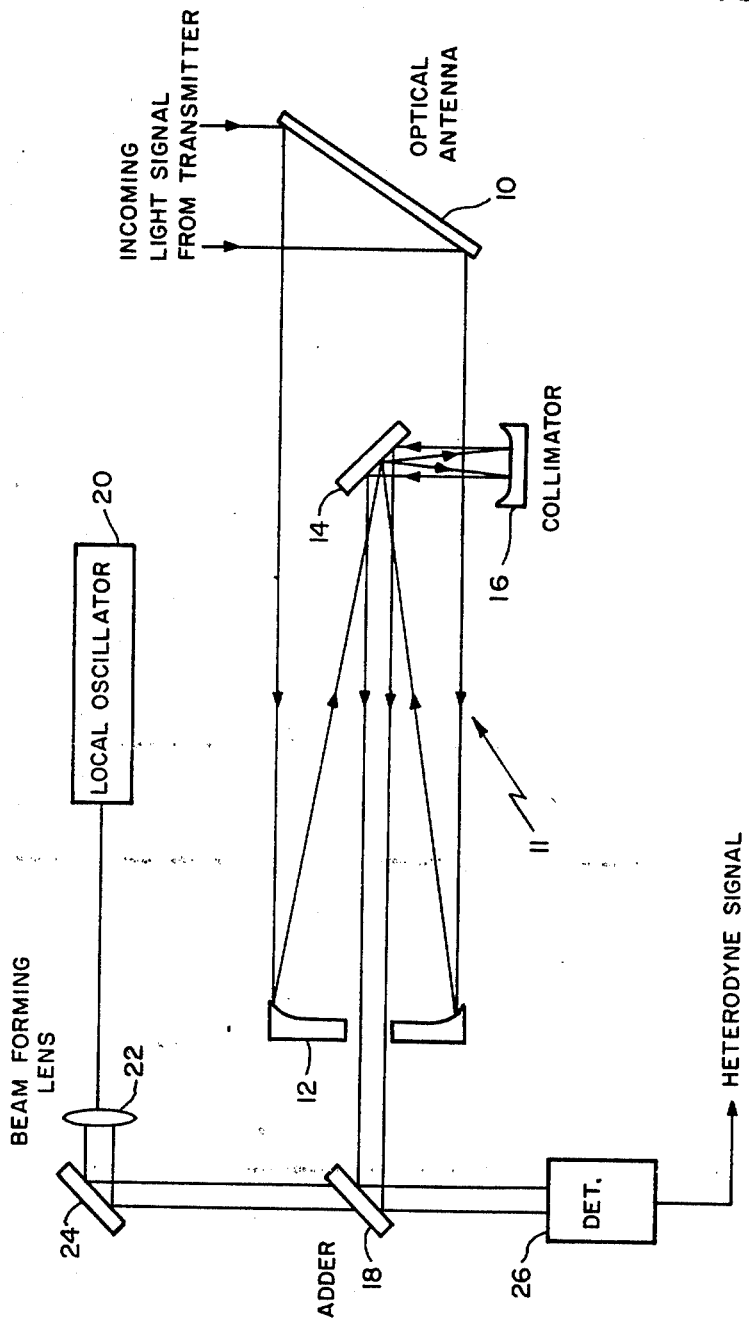
FIG. 1 is a schematic representation of a superheterodyne receiver according to the invention.

A superheterodyne receiver according to the invention is shown in FIG. 1 and comprises an optical antenna, such as a plane mirror 10, a telescope 11, a local oscillator, such as a laser 20, a beam forming lens 22, a plane reflector 24, an adder such as a beam splitter 18, and a photodetector 26, for example a photomultiplier. Telescope 11 is composed of a focusing element 12 such as a concave parabolic reflector, a plane reflector 14, and a secondary collimator such as a concave parabolic reflector 16. The telescope and the lens 22 are designed and adjusted to provide light beams of substantially the same diameter to accomplish proper mixing.

In operation, an incoming optical signal having a plane or a spherical wavefront from a coherent light source such as a laser (not shown), is intercepted by mirror 10 which directs the received light to parabolic reflector 12 which focuses the light onto plane reflector 14 which, in turn, reflects the focused light beam onto parabolic reflector 16 which redirects the light, via reflector 14 and through an opening provided centrally in reflector 12, to adder 18 where the light is reflected onto the photosensitive surface of a photodetector 26. A coherent local oscillator optical signal is generated by laser 20 at a frequency separated from the frequency of the received signal by an amount required to produce the intended heterodyne frequency. This local oscilaltor signal is directed through beam forming lens 22 and, via reflector 24, to adder 18 in coincidence with the beam from the telescope. The signals are mixed at the surface of adder 18 and detected by photodetector 26, the output of the photodetector being the heterodyne signal which is available for subsequent signal processing in a well-known manner.

In accordance with the invention, the light beam from local oscillator 20 has a spherical wavefront. This wavefront is produced by utilizing the near field of the laser beam, and control of the spherical wavefront is achieved by means of beam forming lens 22. The degree of wavefront curvature and the diameter of the light beam is controlled by the thickness and location, respectively, of lens 22. By increasing the thickness of the lens, a higher degree of curvature results and by moving the lens closer to local oscillator 20 a wider beam is obtained. Mirror 24 directs the spherical wavefront local oscillator signal from the beam forming lens 22 to the optical adder 18 where the local oscillator signal is combined with the incoming signal which can be either a plane or spherical wave. The composite signal from adder 18 is then directed to detector 26 which takes a spatial average of the composite light signal. The detector output contains positive and negative signal components representative of the time-changing interference pattern of the heterodyne signals, and a direct current component proportional to the intensities of the two optical waves. Since the detector sums the instantaneous values of the impinging light signals, alternate plus and minus signal components, caused by alternate light and dark fringes, cancel each other and the net output signal is due to the fringes in excess of the equal number of light or dark fringes. In using non-symmetrical waves, such as a plane wave and a spherical waves, there are always fringes even when the two waves are perfectly aligned because the phase fronts can never coincide. As a result, the mixing efficiency of non-symmetrical waves is less than the efficiency of perfectly aligned symmetrical waves; however the mixed non-symmetrical waves permit a useable signal output under conditions of misalignment.

FIG. 2 shows a plot of mixing efficiency versus angular misalignment for the case of two plane waves, and for the case of a plane wave and a spherical wave. The mixing efficiency of two plane waves, which is depicted in the solid curve, is relatively high when the waves are perfectly aligned but the efficiency drops to zero periodically as the angular misalignment increases. It is evident that the efficiency becomes zero at approximately 3 microradian intervals. The output signal from a conventional superheterodyne receiver employing plane waves, therefore, will disappear at certain angles of misalignment. When two non-symmetrical waves are mixed, such as a plane and a spherical wave, as depicted in the dotted curve, the mixing efficiency is relatively low, even when the beam centers are in perfect alignment, but the efficiency only degrades slightly with increasing misalignment. By reason of the dissymmetry of the wavefronts, the light and dark fringes cannot be equal in number; thus, a signal is always present at the output of a photodetector receiving the mixed waves.

An optical superheterodyne receiver that has been constructed and successfully operated employs a parabolic mirror 12 which is 20.3 cm. in diameter with a 2.44 meter focal length, and a parabolic mirror 16 which is 7.6 cm. in diameter with an 18.8 cm. focal length.

The focal oscillator 20 is a helium-neon laser and the beam forming lens 22 is a duo-convex lens with a diameter of 3.8 cm. and a focal length of 1.15 meters. For a signal from a source one kilometer from the antenna 10, the beam forming lens 22 is positioned 1.10 meters from the local oscillator.

From the foregoing, it is evident that a superheterodyne receiver with relaxed angular tolerances between the local oscillator and incoming signals has been provided. Although a preferred embodiment of the invention has been shown and described, modifications and alternative implementations will occur to those skilled in the art without departing from the true scope of the invention. Accordingly, the invention is not to be limited by what has been particularly shown and described except as indicated in the appended claims.

What is claimed is:
1. An optical superheterodyne received comprising:
   a signal source operative to provide a coherent light signal of a predetermined frequency and wavefront;
   local oscillator means operative to provide a coherent light signal having a wavefront non-symmetrical to the wavefront of said source signal and separated in frequency from the frequency of said source signal;
   optical means operative to combine the signals from said source and said local oscillator means; and
   a photodetector operative in response to the combined signals from said source and said local oscillator means to produce an electrical output signal having a frequency equal to the difference between the frequency of the signal from said source and the frequency of the signal from said local oscillator means.

2. The invention according to claim 1 in which the signal from said source has a plane wavefront and the signal from said local oscillator means has a spherical wavefront.

3. The invention according to claim 1 in which said optical means includes an optical antetnna operative to receive the signal from said source, a telescope operative to magnify the received signal and image it in a plane coincident with the local oscillator signal, and an optical adder disposed in said plane and operative to combine the received signal and the local oscillator signal.

4. The invention according to claim 1 in which said local oscillator means includes a laser and a beam forming lens disposed in light traismitting relationship with said laser and operative to provide a light signal having a predetermined spherical wavefront.

5. The invention according to claim 1 in which the signal from said source has a first spherical wavefront and the signal from said local oscillator means has a second spherical wavefront of a different radius of curvature than the signal from said source signal.

References Cited

UNITED STATES PATENTS 3,426,207  2/1969  Fired et al. _____ 250—199

ROBERT L. GRIFFIN, Primary Examiner

A. J. MAYER, Assistant Examiner